Sept. 4, 1962  L. S. WASSERMAN ETAL  3,052,128
AUTO PILOT STRUCTURE
Original Filed March 22, 1954  2 Sheets-Sheet 1
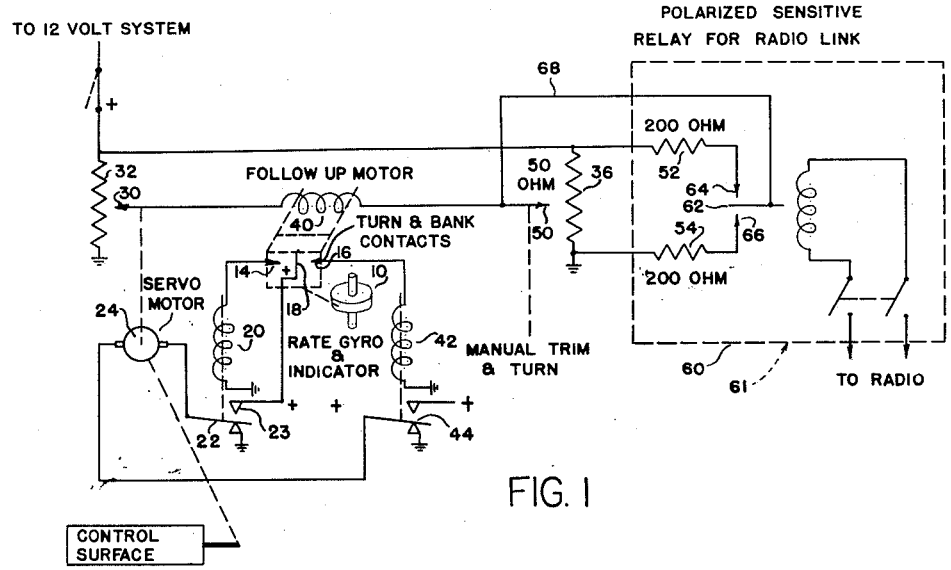
FIG. 1
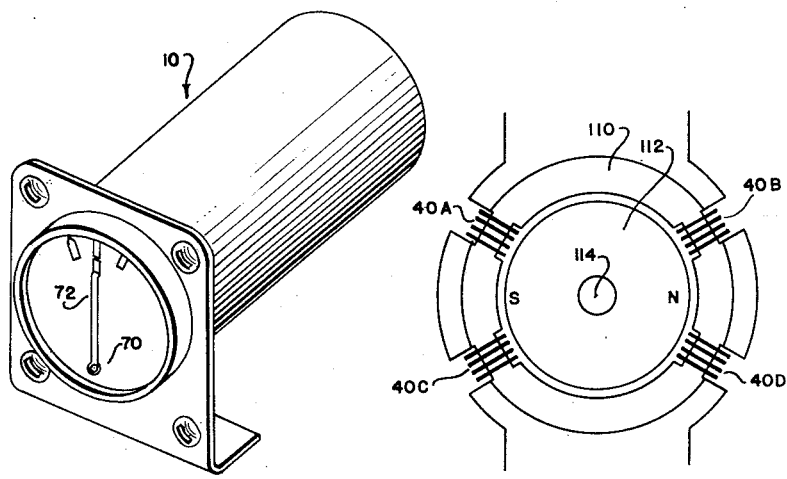
FIG. 2
FIG. 7
INVENTORS
LEE S. WASSERMAN
ADAM J. STOLZENBERGER
BY
THEIR ATTORNEY

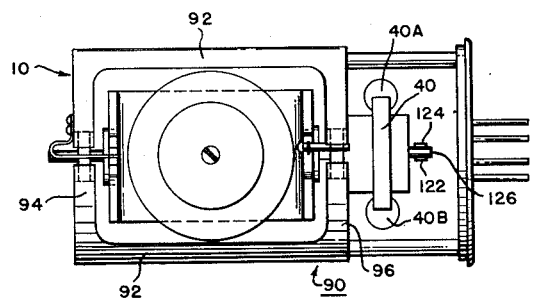
FIG. 3
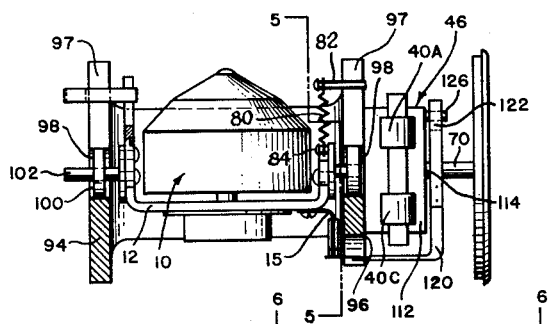
FIG. 4
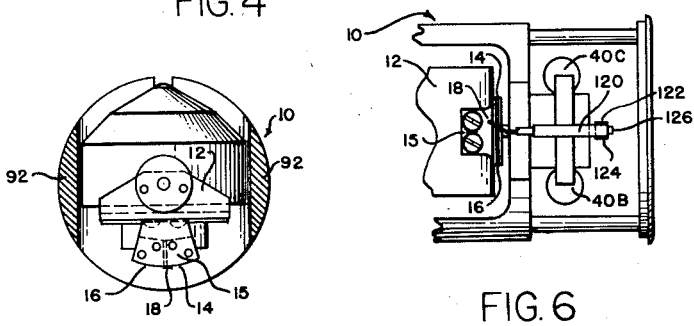
FIG. 5
FIG. 6 under# United States Patent Office 3,052,128
Patented Sept. 4, 1962

3,052,128
AUTO PILOT STRUCTURE
Lee S. Wasserman and Adam J. Stolzenberger, Dayton, Ohio, assignors to Globe Industries, Inc., a corporation of Ohio
Original application Mar. 22, 1954, Ser. No. 417,708, now Patent No. 2,910,639, dated Oct. 27, 1959. Divided and this application Dec. 5, 1958, Ser. No. 778,514
8 Claims. (Cl. 74—5.4)

This invention pertains to a single axis auto pilot and more particularly to an auto pilot for use in aircraft, although not necessarily so limited.

In the flying of airplanes there is a tendency for the airplane to roll and yaw, as is well known to those skilled in the art. If, for example, the right wing drops so that the right wing is lower than the left wing, the airplane will turn to the right. Slight adjustment of the rudder to the left to prevent this turn will cause the airplane to slip, so that the dihedral effect will raise the wing, as would application of the left aileron. In some airplanes, this interaction between roll and yaw has led to the use of an elastic connection between the ailerons and the rudder.

This application is a division of our prior copending application Serial No. 417,708, filed March 22, 1954, now U.S. Patent No. 2,910,639, issued October 27, 1959.

An object of this invention is to provide an auto pilot that will automatically straighten the plane by applying a corrective movement to the rudder and possibly the proper aileron, the rudder and the aileron being actuated into home position as soon as the airplane has again been stabilized. This single axis auto pilot provides maximum utility, dependability and safety in an automatic pilot system at a minimum cost.

The operation of the auto pilot depends upon two very small direct current servo-motors, which have proven very satisfactory in the miniature D.C. motor field. The turn and bank indicator, in addition to a motor powered gyro wheel, includes an air-damping cylinder, ball-bank indicator, hand indicator mechanism and a wiping contactor mounted on an electric torque motor. When the gyro moves, due to a turn, the wiper energizes one of the servo-motor relays, which causes the control surface to move. Motion of the servo moves the wiper on a servo potentiometer, which unbalances an electrical bridge whose output energizes the torque motor. The resulting motion of the torque motor moves the wiper in such a way as to remove the signal to the servo relay. This extremely simple follow-up system eliminates the complexity and lack of flexibility inherent in mechanical follow-ups.

The servo-motor receives its torque from a powerful actuator. The servo output is coupled to the output pulley by means of a friction clutch which is manually engaged. The control of this clutch mechanism by the pilot plus the slip possibilities provided by such a clutch, insure the safety of the installation. A further factor of safety has been added by the fact that the clutch can be released by one-quarter turn of the operating handle. The servo-motor incorporates its actuating relays plus the potentiometer which forms half of the follow-up bridge. The control panel of the airplane contains the main off-on switch, fuse, balance potentiometer and radio link off-on switch and relays. The balance potentiometer serves as half of the follow-up bridge and is used to trim out a turn, or automatically it can be used to turn the airplane as desired through the auto-pilot, when the auto pilot is engaged. A radio link switch engages the radio link relay to the radio. Operation of this relay unbalances the follow-up bridge by means of fixed resistors.

Here, again, the simplicity of coupling the electrical follow-up to a radio signal demonstrates the advantage of such a follow-up system. For those cases where radio outputs are too small to operate the radio link relay, a small electronic amplifier may be included in the control box.

Other objects and advantages resides in the construction of parts, the combination thereof and the mode of operation, as will become more apparent from the following description.

In the drawings, FIGURE 1 is a schematic wiring diagram of the single axis auto pilot.

FIGURE 2 is a perspective view of the gyroscope.

FIGURE 3 is a side elevation view of the gyroscope.

FIGURE 4 is a top plan view of the gyroscope with parts shown in section.

FIGURE 5 is a cross sectional view, taken substantially on the line 5—5 of FIGURE 4.

FIGURE 6 is a fragmentary, enlarged view looking in the direction of the arrow 6—6 of FIGURE 5.

FIGURE 7 is an enlarged schematic view of the follow-up motor.

Before describing the operation of the single axis auto pilot, the component parts of the electrical circuit, as shown in FIGURE 1, will first be described. Referring to this figure, the reference numeral 10 indicates a rate gyroscope, the gimbal of which has attached thereto a bracket 15 (see FIGURES 4 and 5) that supports a pair of contacts 14 and 16. An adjustable contact 18 is mounted between the contacts 14 and 16, so that as the rate gyroscope moves the contact 14 or 16 to the right or to the left, as viewed in FIGURE 1, the contact 18 engages the contact 14 or 16, as the case may be. The contact 18 is connected to a suitable source of electrical energy, as for example, a 12 volt direct current system. For example, when the contact 18 engages the contact 14, a relay 20 is energized to close the switch 22 by engaging the contact 23, which energizes a servo-motor 24, causing it to rotate in one direction.

When the contact 16 moves into engagement with the contact 18 or the contact 18 moves into contact with the contact 16, as the case may be, a relay 42 is energized, closing a switch 44. The movable contact element of the switch 22 is then grounded, so as to close the circuit through the servo-motor; but the current flows through the servo-motor in the opposite direction, thereby reversing the direction of the servo-motor. By way of explanation, it might be stated that the servo-motor 24 is preferably provided with permanently magnetized poles. This particular servo-motor that has been used is a very small motor, operating at an extremely high speed. This permits the use of a very light weight motor developing a large torque through a suitable planetary gear reducing mechanism. The servo-motor, when rotating in one direction, actuates a sliding contact 30 in one direction on the potentiometer 32, and when it rotates in the opposite direction, it actuates the sliding contact 30 in the opposite direction on the potentiometer 32. This potentiometer 32 is connected in parallel with a potentiometer 36, so as to form what may be referred to as a normally balanced circuit including the two potentiometers, their interconnecting leads and the windings 40 of a torque or follow-up motor. This balanced circuit has one terminal connected to the 12 volt system and the other terminals grounded, as shown. No current flows through the follow-up motor windings 40 when the circuit is balanced, in that the voltage drop between the source of electrical energy and the contact 30 is then equal to the voltage drop of that portion of the potentiometer 36 located between the 12 volt system and the contact 50. That being the case, there is zero voltage across the windings 40 of the follow-up motor. Whenever the contact 30 is adjusted, the circuit A becomes unbalanced and the current flows through the windings 40 either to the left or to the right, as shown in FIGURE 1, depending upon the polarity of the voltages supplied to the windings 40. Whenever a current flows through the follow-up motor, the movable contact 18 is shifted to the right or to the left, depending upon the direction of flow of current through the windings 40, for purposes which will be described more fully later. The follow-up motor actuates the contact 18 away from the contact 14 or 16, as the case may be, to de-energize the servo-motor 24. The operation of the servo-motor 24 and the contacts 14 and 16 will be described more fully under the Mode of Operation.

The balanced circuit may also be unbalanced manually by actuating a manual trim and turn knob on the instrument board, that has not been shown, actuating the movable contact 50 of the potentiometer 36. By actuating the manual trim and turn knob in one direction, the contact 50 is actuated upwardly, as viewed in FIGURE 1, so as to decrease the resistance between the 12 volt system and the movable contact 50 or by turning the manual trim knob in the opposite direction, the movable contact 50 may be adjusted downwardly, so as to increase the resistance of the potentiometer 36 found in the balanced circuit.

A pair of normally open resistances 52 and 54 are attached to the terminals of the potentiometer 36. Resistance 52 is connected to a stationary contact 64 and the resistance 54 is connected to a fixed contact 66. Contacts 64 and 66 are mounted in close proximity to each other. A movable contact 62 is mounted between the contacts 64 and 66 and is normally out of contact with these contacts. The contact 50 on the potentiometer 36 is connected by means of a lead 68 to the contact 62. A polarized sensitive relay for the radio circuit shown schematically at 60 may be used for adjusting the contact 62 into engagement with either the contact 64 or the contact 66. When the contact 62 engages the contact 64, the resistance 52 is connected in parallel with the portion of the resistance of the potentiometer 36 connected into the balanced circuit, thereby reducing the voltage drop between the 12 volt system and the contact 50, so as to cause an unbalanced condition. In the event the contact 62 engages the contact 66, the resistance 54 is connected in parallel with that portion of the potentiometer 36 connected between the contact 50 and ground, thereby reducing the resistance of this portion of the circuit, so as to increase the voltage drop from the 12 volt system and the contact 50 to unbalance the circuit of FIGURE 1.

Before describing the theory of operation, a brief description of the gyroscope and the parts associated therewith will be made. As is well known to those skilled in the art, when an airplane passes through a curved path, the pilot may not be aware of the fact that the airplane is not level due to centrifugal force. Referring to FIGS. 3–6 a gimbal 12 of the gyroscope is connected by a shaft 70 to an indicator 72, visually indicating the rate of turn of the airplane. Suffice to state that the gimbal 12 is mounted in a frame 90 that includes a pair of arcuate cylindrical sectors 92, one on either side, and a pair of end sectors 94 and 96. Each of these end sectors is provided with a vertical slot 97 terminating in an enlarged circular opening 98. Outer races of circular bearings are in the circular openings 98. The bearings 100 are inserted through the outer ends of the end frames 94 and 96. By this arrangement, it is possible to use a frame 90, wherein the side portions 92 and the end frame portions 94 and 96 may consist of a single piece which may be formed as a die casting. The gimbal may be inserted by means of the shafts 102 being inserted through the vertical slots, then the bearings 100 slipped in from the outer ends over the ends of the shaft, so as to journal the gimbal in the frame. A rate spring 80 is mounted at one end to a stud 82 affixed to sector 96, and at its other end to a stud 84 on the gimbal 12. The spring 80 provides the restraining force tending to maintain vertical alignment of gimbal 12, as shown in FIGURE 4.

The follow-up motor 46 is mounted on the end 96 of the frame 90. The follow-up motor winding may consist of a plurality of coils 40a, 40b, 40c and 40d, (see FIG. 7). These coils are wound upon portions of a soft iron ring forming a stator surrounding a magnetized rotor. The movable contact 18 is connected by a bracket 120 to the magnetized rotor. When the field windings 40 are de-energized, the contact 18 is positioned between the contacts 14 and 16, that is, when the plane is maintained on a straight course.

The follow-up or torque motor has been shown schematically in FIGURE 7. It consists of a soft iron ring 110 functioning as a stator and a permanent magnet 112 functioning as a rotor. The stator 110 is fixedly attached in any suitable manner to the end frame 96. It is provided with four windings 40a, 40b, 40c and 40d. These windings correspond to the winding 40 shown schematically in FIGURE 1. These coils are connected in any suitable maner into the balanced circuit of FIGURE 1. They may be connected in series or in parallel or in series parallel relation. The coils 40a–b–c–d are wound so as to have a cumulative effect, that is, when the current flows in one direction through the follow-up winding 40, a torque is applied to move the rotor clockwise or counterclockwise, that is, the torque is clockwise when the current flows in one direction and counterclockwise when the current flows in the opposite direction. The rotor 112 is mounted upon a shaft 114 having fixedly mounted thereon an L-shaped bracket 120 carrying the contact 18. The bracket 120 supports a pair of laterally disposed springs 122 and 124 projecting beyond the end of bracket member 120 and straddling a stud 126 fixedly mounted with respect to the end frame 96. These springs 122 and 124 exert a bias upon the bracket 120 always tending to center this bracket and thereby center the contact 18. However, this biasing effect is counteracted by the torque on the rotor 112 when a current flows into the follow-up motor coils. A soon as the coils 40a–b–c–d are de-energized, the springs 122 and 124 center the contact 18, the spring 122 centering the bracket 120 whenever the top of the bracket 120 has been raised, as viewed in FIGURE 6, and the spring 124 exerting a force and centering the bracket 120 whenever the upper portion (as viewed in FIGURE 6) has been moved downwardly off center.

The servo-motor 24, as stated above, rotates at a very high rate of speed, probably on the order of 12,000 r.p.m. It is geared down through a planetary gear system, so that the output shaft rotates at a very slow speed, so to speak, creeps. In addition to reducing the speed, this planetary gear system has several advantages. One is that a very small motor, rotating at a very high speed, is capable of developing a very large torque at the output shaft. Furthermore, when the servo-motor is de-energized and stops, the output shaft is held in position, in that any forces applied to the output shaft will not the motor. By this arrangement, it remains in this position until the servo-motor is again energized, so as to prevent creeping of the rudder from an adjusted position. Any air pressure applied to the rudder has no effect thereon. The only adjustment of the rudder that can be made when the single axis auto pilot disclosed herein is used, is made solely by the servo motor 24.

*Mode of Operation*

When the balanced bridge circuit is balanced so that no current flows through the coils 40 of the follow-up motor and the airplane is level, the contact 18 is positioned in what might be referred to as a dead center or a neutral position located between the contacts 14 and 16 mounted upon the gimbal of the gyroscope. Let it be assumed, for the sake of explanation, that the airplane turns to the right and let it be assumed that the contact 14 is located to the right and the contact 16 is located to the left on the gimbal, as viewed in FIGURE 5. In view of the fact that the gyro moves about its pivot shafts 102, the contact 16 will move into engagement with the contact 18. In so doing, the relay 42 will be energized so as to close the switch 44, thereby energizing the servo-motor 24. As soon as the servo-motor 24 is energized, the rudder is moved to the left, thereby tending to straighten the airplane and at the same time the contact 30 is actuated, so as to unbalance the circuit of FIGURE 1, causing a current to flow through the windings 40a–b–c–d, which applies to a torque to the rotor, to actuate the contact 18 out of engagement with the contact 16. Since the springs 122 and 124 are biasing the contact 18, the torque motor 40 must work against the springs, the energy supplied by the torque motor being proportional to the deflection required to separate the contacts 16 and 18. The energy supplied to the torque motor is determined by the position of the wiper 30 and, hence, by the position of the control surface, since both the wiper 30 and the control surface are driven by the servo-motor 24. Thus, the position of the control surface is determined by the deflection of the contact 18. This deflection is the deflection of the gyro with respect to the craft. It is thus clear that the correction applied to the control surface is proportional to the tilt of the craft relative to the gyro.

As soon as the contact 18 is disengaged from the contact 16 the servo-motor 24 is de-energized. However, due to the unbalanced condition of the circuit, the follow-up motor remains energized, thereby holding the contact 18 in an off-center position. As the airplane approaches zero rate of turn, the contact 18, being away from the normal dead center position, engages the contact 14 which is moved by gimbal 12, thereby energizing the relay 20, closing the switch 22 to energize the servo-motor 24. This servo-motor now rotates in a direction opposite to the previous direction of rotation, thereby actuating the rudder into its normal home position and actuating the contact 30 into a balanced position, thereby de-energizing the follow-up motor, namely, the windings 40a–b–c–d. As soon as the windings of the follow-up motor are de-energized, the two springs 122 and 124 will aid in shifting the rotor and the contact 18 into dead center. As soon as the contact 18 moves into dead center and the airplane is flying straight, the servo-motor is de-energized, the circuit of FIGURE 1 is balanced and the airplane will continue on a straight course.

The course may be changed. This may be accomplished by actuating a manual trim and turn knob on the instrument board (not shown), so as to actuate the movable contact 50 upwardly or downwardly, so as to unbalance the circuit. As the circuit is unbalanced, the follow-up motor is energized, so as to apply a torque to the rotor in a clockwise direction or in a counterclockwise direction, as the case may be. Let it be assumed that it is desired to veer to the left. The rotor is then shifted slightly in a counterclockwise direction, as viewed in FIGURE 7. In so doing, the contact 18 comes in contact with the contact 16, so as to energize the servo-motor 24, thereby actuating the rudder towards the left. The movable contact 30 will also be adjusted to move the contact 18 out of engagement with the contact 16; but not far enough to balance the circuit so as to hold the airplane on the curved course until the manual trim and control knob is adjusted to home position.

The course may also be controlled by the polarized sensitive relay 61 of a ratio circuit. This is accomplished by actuating the contact 62 into engagement with the contact 64 or the contact 66, so as to unbalance the circuit, thereby energizing the follow-up motor to cause a relative movement between the motor and the stator, so as to energize the servo-motor 24 to do two things, one, to actuate the contact 30, and, two, to actuate the rudder, so as to cause the airplane to curve to the right or to the left, as the case may be. The circuit is unbalanced, so that the voltage drop across the resistance between the 12 volt system and the movable contact 30 is unequal to the voltage drop between the 12 volt system and the contact 50, so that the follow-up motor remains energized and the airplane will be kept on a curved path until it is released from this path by the radio signal.

In the event the airplane is turning, due to atmospheric disturbances, so as to shift the airplane from the curved path selected by the manual control knob or the radio signal, the contact 18 will again engage one of the contacts 14 and 16, resulting in the servo-motor making a correction of the rudder and at the same time maintaining the circuit unbalanced, so as to change the energization of the stator field windings 40a, 40b, 40c and 40d to prevent overthrow by causing the contact 14 or 16, as the case may be, to move out of contact with the movable contact 18, the airplane returning to the proper curve of flight.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

What we claim is:

1. A rate gyro including a gimbal having aligned shafts forming trunnions, an integral frame structure including a pair of arcuate sectors, one on either side of the gimbal, and a pair of end sectors, one of which has a slot extending from the margin to the center thereof, said slot terminating in an enlarged opening, the other sector having a centrally disposed opening; and a pair of bearings having the outer races mounted in the openings, the shafts of the gimbal being journalled in said bearings so as to permit the gimbal to oscillate in the frame, and wherein a torque motor having a wound stator and a permanent magnet armature is fixedly mounted on one of the end sectors, the armature being coaxially mounted with respect to the axis of oscillation of the gimbal, a member having a pair of spaced contacts, a second member having contact means, one of said members being mounted on the gimbal, the other being mounted for movement with the armature so that as the frame tilts with respect to the gimbal the contact means engages one of the contacts of the first member.

2. A rate gyro including a frame having a pair of end members and a pair of aligned bearings, one in each end member, a gimbal having a pair of coaxial shafts journalled in said bearings, a torque motor having a wound stator and a permanent magnet armature, the axis about which the armature is pivoted being coaxial with the axis of oscillation of the gimbal, the stator being fixedly attached to one of the end members of the frame, a pair of contact means, supporting means for said pair of contact means, a third contact means, one of said means being mounted upon the gimbal and the other means being mounted for movement with the armature, said means being so constructed and arranged that as there is a relative movement in one direction between the gimbal and the frame one set of contacts is closed, and as there is a relative movement in the other direction another set of contacts is closed.

3. A rate gyro including a frame, a gimbal pivotally mounted in the frame, a torque motor having a wound stator and a pivotally mounted permanent magnet armature, the axis about which the armature is pivoted being coaxial with the pivotal mounting of the gimbal, the stator being fixedly attached to the frame and consisting of a soft iron ring surrounding the magnetized armature, and a plurality of coils wound on the soft iron ring, two sets of contacts, one set of contacts being mounted on the gimbal, the other set of contacts being mounted for movement with the armature, said contacts being so constructed and arranged that as the relative movement of the frame with respect to the gimbal is in one direction one pair of contacts will be closed and when the relative movement is in the opposite direction another pair of contacts will be closed, and means for energizing the coils when the contacts are closed, said means causing the current to flow in one direction through the coils when one set of contacts is closed and causing the current to flow in the opposite direction through the coils when another set of contacts is closed.

4. A rate gyro including a frame, a gimbal pivotally mounted in the frame, a torque motor having a wound stator and a permanent magnet armature, the axis about which the frame is pivoted being co-axial with the pivotal mounting of the gimbal, the wound stator being fixedly attached to the frame and consisting of a soft iron ring surrounding the magnetized armature.

5. A rate gyro according to claim 4 wherein pairs of coils are wound on the stator, there being one coil on each side and in close proximity to the poles of the permanent magnet.

6. A rate gyro according to claim 5, wherein means are provided for energizing the coils so as to cause a current to flow through the coils, and means for reversing the direction of flow of the current through the coils.

7. A rate gyro according to claim 5, wherein means are provided for energizing the coils so as to bias the poles of the armature in one direction when the current flows in one direction through the coils, and biasing the poles of the armature in the opposite direction when the current flows in the opposite direction through the coils.

8. A rate gyro according to claim 5, wherein one contact is mounted upon the armature and a pair of contacts is mounted one on either side of the first mentioned contact, means for mounting the pair of contacts in fixed relation with respect to the gimbal, and circuit means for connecting the respective contacts to a source of energy and to the stator coils, the first mentioned contact when engaging one of the pair of contacts causing the current to flow in one direction through the coils and when contacting the other contact causing the current to flow in the opposite direction through the coils.

References Cited in the file of this patent
UNITED STATES PATENTS

| | | |
|---|---|---|
| 1,150,311 | Sperry | Aug. 17, 1915 |
| 1,183,530 | Brennan | May 16, 1916 |
| 1,188,949 | Koehler | June 27, 1916 |
| 2,308,925 | Kehse et al. | Jan. 19, 1943 |
| 2,563,983 | Watson | Aug. 14, 1951 |
| 2,817,239 | Davis | Dec. 24, 1957 |